(12) United States Patent
Odajima et al.

(10) Patent No.: US 6,611,488 B1
(45) Date of Patent: Aug. 26, 2003

(54) OPTICAL HEAD, OPTICAL PART, AND OPTICAL MEMORY APPARATUS HAVING CONTROLLED OPTICAL INTENSITY

(75) Inventors: Wataru Odajima, Kawasaki (JP); Shinya Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/362,362

(22) Filed: Jul. 28, 1999

(30) Foreign Application Priority Data

Jan. 8, 1999 (JP) .......................................... 11-003441

(51) Int. Cl.$^7$ ................................................. G11B 7/00
(52) U.S. Cl. ................................................. 369/112.06
(58) Field of Search ...................... 369/112.01, 112.22, 369/112.23, 112.24, 112.25, 112.26, 112.27, 44.23

(56) References Cited

U.S. PATENT DOCUMENTS

| 4,778,237 A | 10/1988 | Sorin et al. |
| 5,286,971 A | 2/1994 | Betzig et al. |
| 5,315,573 A | 5/1994 | Nakao et al. |
| 5,420,846 A | 5/1995 | Sugiyama et al. |
| 5,576,084 A | 11/1996 | Kuroda |
| 5,767,891 A | 6/1998 | Hirokane et al. |

FOREIGN PATENT DOCUMENTS

| EP | 715303 | 6/1996 |
| EP | 915458 | 5/1999 |
| JP | 5189796 | 7/1993 |
| JP | 6162564 | 6/1994 |
| JP | 8106646 | 4/1996 |
| JP | 9231608 | 9/1997 |
| JP | 10162443 | 6/1998 |
| WO | 9927532 | 6/1999 |

*Primary Examiner*—Paul W. Huber
(74) *Attorney, Agent, or Firm*—Greer, Burns & Crain, Ltd.

(57) ABSTRACT

An optical part has an exit surface from which beams of light applied through an incident surface are emitted, and a transmission film permitting the beams of light emitted from the exit surface to be transmitted at higher transmittance with higher light intensity. The exit surface is covered by the transmission film.

24 Claims, 16 Drawing Sheets

OPTICAL HEAD, OPTICAL PART, AND OPTICAL MEMORY APPARATUS HAVING CONTROLLED OPTICAL INTENSITY

BACKGROUND OF THE INVENTION

1. Field of the Invention

The present invention relates to an optical head driven by a predetermined driving mechanism to move close to a predetermined storage medium for applying beams of light to a surface of the storage medium, a lens used for such an optical head, and an optical memory apparatus for performing read and write of information to the storage medium using such an optical head.

2. Description of the Prior Art

Hitherto, there is known an optical memory apparatus in which an optical head as mentioned above is used to condense beams of light on a storage medium so that a condensed spot is formed on the storage medium, and the condensed spot is used to write information into the storage medium by means of heating the storage medium, or the condensed spot is used to read information from the storage medium. Recording density of information by such an optical memory apparatus is higher with the smaller diameter of the condensed spot.

According the conventional optical memory apparatus, it is general to use an optical head in which a condensing system such as a condensing lens is used to form a condensed spot. However, it is difficult to reduce a diameter, of the condensed spot formed by the condensing system less than a size referred to as a diffraction limit which will be described later.

On the other hand, there is a proposed technology wherein a specific condensing system, which is small in the diffraction limit per se, is used to record information with greater density, and a technology wherein an optical fiber and the like is processed to form a microscopic emitting outlet so that a small size of the condensed spot is physically formed.

Recently, it is desired to greatly increase the recording density of information read and written by the optical memory apparatus. Thus, there is desired a technology of implementing a spot of which diameter is smaller than a wavelength of a laser beam. However, according to the above-mentioned technology using the specific condensing system, a diameter of the spot is simply reduced to the extent of the wavelength of a laser beam. And, according to the above-mentioned technology using the microscopic emitting outlet, it is difficult to form an emitting outlet smaller than the wavelength of a laser beam per se.

SUMMARY OF THE INVENTION

In view of the foregoing, it is an object of the present invention to provide an optical head capable of forming a condensed spot of which a diameter is smaller than a wavelength of light and is easily fabricated, a lens suitable for such an optical head, and an optical memory apparatus for performing read and write of information to a storage medium with high density.

To achieve the abode-mentioned objects, the present invention provides an optical head applying beams of light to a surface of the storage medium, said optical head comprising:

a light emission unit for emitting a light beam;

an optical part having an incident surface onto which light beam is incident and an exit surface from which the light beam applied through the incident surface is emitted; and a transmission unit permitting part of a predetermined optical intensity or more of the light beam emitted from the exit surface of said optical part to pass through said transmission unit.

In the optical head as mentioned above, it is acceptable that said transmission unit is made of a material in which part of an incident light energy is converted into a thermal energy, said material permitting an incident light to be transmitted at higher transmittance with higher temperature. Or alternatively, it is acceptable that said transmission unit is made of a saturable absorber having properties in which an absorbency index is lowered in accordance with an increment of an incident light intensity.

According to the optical head of the present invention, the exit surface is covered by the transmission unit as mentioned above. Consequently, of the light beam, applied to the exit surface, only part of the high optical intensity is transmitted through the transmission unit. Thus, when the light beam, stopped up to a wavelength or so by an optical system, is applied to the exit surface, as will be described later, a condensed spot of which a diameter is smaller than the wavelength is formed by the transmission unit. The transmission unit as mentioned above can be easily formed, for example, in such a manner that the exit surface is subjected to a coating treatment in the form of a transmission film. Further, it is acceptable that the transmission unit is formed as a sheet provided apart from the exit surface. Or alternatively, it is acceptable that the transmission unit is formed as a layer by processing the optical part itself.

In the optical head as mentioned above, it is acceptable that the optical part establishes a focus of the light beam on said exit surface. Or alternatively, it is acceptable that the optical part is an optical fiber.

In case of the optical head using the optical fiber, it is desired that the optical fiber has said exit surface on one end of said optical fiber, said optical fiber having a configuration tapered toward the one end.

This feature makes it possible to form a condensed spot which is high in light intensity.

Further, in case of the optical head using the optical fiber, it is desired that said optical fiber has a projecting exit surface on one end of said optical fiber.

This feature makes it possible to form a condensed spot which is high in light intensity.

To achieve the above-mentioned objects, the present invention provides a first optical part comprising:

an optical part comprising:

an incident surface onto which a light beam is incident;

an exit surface from which the light beam applied through said incident surface is emitted; and a transmission unit permitting part of the light beam emitted from the exit surface to be transmitted at higher transmittance with higher light intensity.

To achieve the above mentioned objects, the present invention provides an optical part comprising an incident surface onto which a light beam is incident, and an exit surface from which the light beam applied through said incident surface is emitted, wherein a transmission layer, which permits part of a predetermined optical intensity or more of the light beam to pass through said transmission layer, is provided on said exit surface.

In connection with an optical part of the present invention, it is acceptable that the optical part is a lens or an optical fiber.

To achieve the above-mentioned objects, the present invention provides a first optical memory apparatus comprising:

an optical memory apparatus comprising:
- a light emission unit for emitting a light beam;
- an optical part having at least a transmission unit permitting part of a predetermined optical intensity or more of the light beam emitted from the light emission unit to pass through said transmission unit;
- a storage medium holding mechanism for holding a storage medium, to which the part of the light beam is applied, at a predetermined position; and
- an optical part driving mechanism for driving said optical part.

According to the first optical memory apparatus, it is possible to perform read and write of information at high density by a condensed spot having a diameter smaller than a wavelength of light.

In the first optical memory apparatus as mentioned above, it is acceptable that said optical part driving mechanism drives the optical part in a state that the storage medium is held, and that the storage medium holding mechanism and the transmission unit are spaced from one another by a length not more than a wavelength of the light beam.

Further, in the first optical memory apparatus mentioned above, it is acceptable that said transmission unit is made of a material in which part of an incident light energy is converted into a thermal energy, said material permitting an incident light to be transmitted at higher transmittance with higher temperature. Alternatively, it is acceptable that said transmission unit is made of a saturable absorber having properties in which an absorbency index is lowered in accordance with an increment of an incident light intensity.

Further, in the first optical memory apparatus as mentioned above, it is acceptable that the optical part establishes a focus of the light beam on said exit surface. Alternatively, it is acceptable that the optical part is an optical fiber.

Further, to achieve the above-mentioned objects, the present invention provides a second optical memory apparatus comprising:

an optical memory apparatus comprising:
- a light emission unit for emitting a light beam;
- an optical part having an incident surface onto which the light beam is incident, and an exit surface from which the light beam applied through the incident surface is emitted, said optical part being formed so as to condense the light beam on the exit surface and having numerical aperture not more than 0.75;
- a storage medium holding mechanism for holding a storage medium, to which the light beam is applied, at a predetermined position; and
- an optical part driving mechanism for driving said optical part in a state that the storage medium held by said storage medium holding mechanism and said exit surface are spaced from one another by a length not more than one-tenth of a wavelength of the light beam.

According to the second optical memory apparatus, as will be described later, even if a length between the exit surface and a surface of the storage medium is varied, a quantity of light irradiated onto the storage medium is stable. This feature makes it possible to perform a stable read and write of information for a storage medium and also to perform read and write of information at high density.

In the second optical memory apparatus as mentioned above, it is acceptable that said optical part has a transmission unit permitting part of a predetermined optical intensity or more of the light beam emitted from the light emission unit to pass through said transmission unit.

In case if the second optical memory apparatus using the optical part having the transmission unit, it is acceptable that said transmission unit is made of a material in which part of an incident light energy is converted into a thermal energy, said material permitting an incident light to be transmitted at higher transmittance with higher temperature. Alternatively, it is acceptable that said transmission unit is made of a saturable absorber having properties in which an absorbency index is lowered in accordance with an increment of an incident light intensity.

DETAILED DESCRIPTION OF PREFERRED EMBODIMENTS

Before dealing with embodiments of the present invention, there will be described a comparative example, and then the principle of the present invention.

Figure 1:
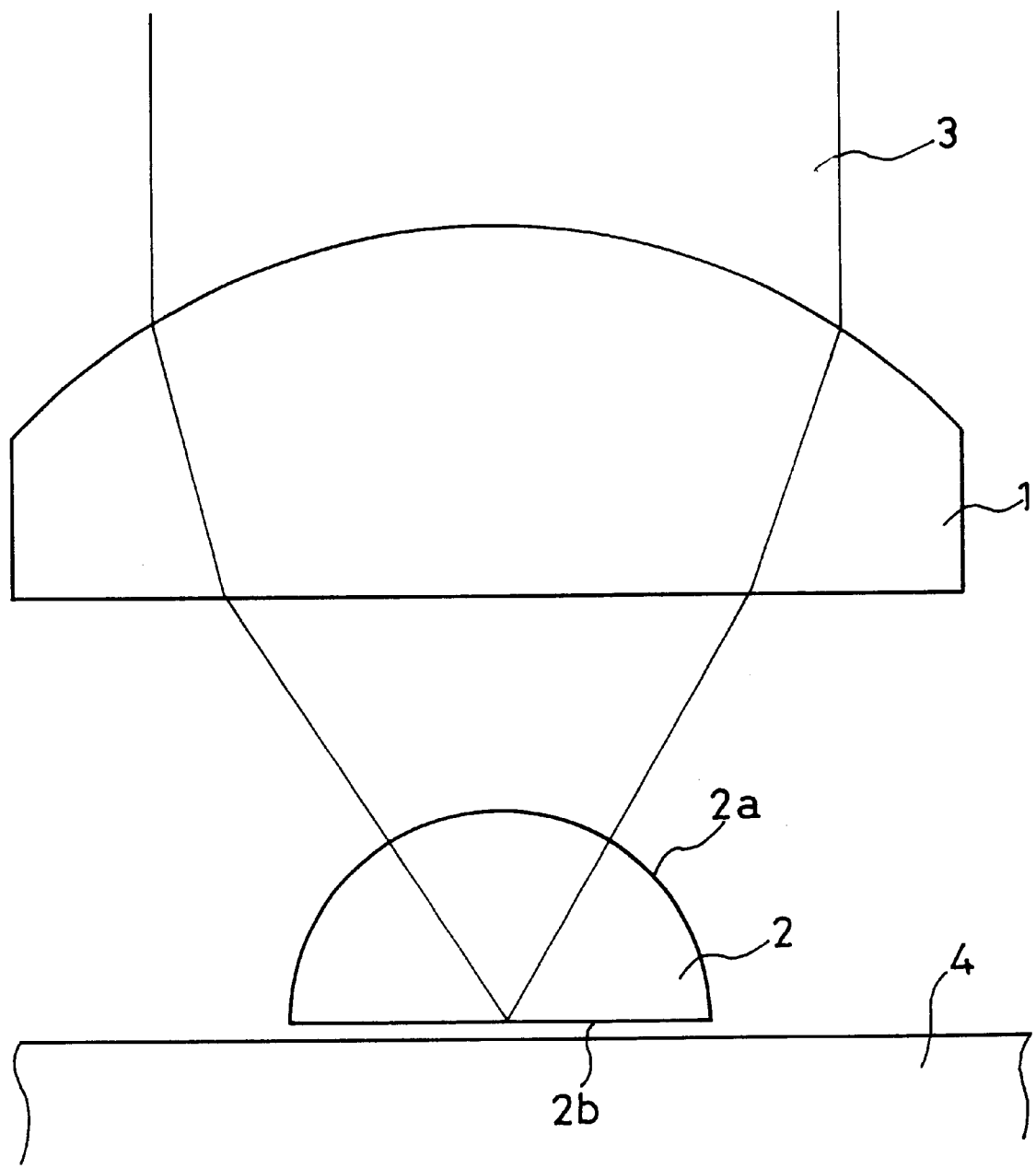
FIG. 1 is a conceptual view showing a comparative example using a specific condensing system which is small in diffraction limit per se.

FIG. 1 is a conceptual view showing a comparative example using a specific condensing system which is small in diffraction limit per se.

The condensing system shown in FIG. 1 is devised to be small in diffraction limit per se. The diffraction limit $r_e$ is expressed by $$r_e = 0.41 \lambda / (\text{N.A.}) \qquad (1)$$

where λ0 is a wavelength of a laser beam, and N.A. is a numerical aperture.

The numerical aperture N.A. is expressed by $$(N.A.) = na/2f \qquad (2)$$

where a is an entrance pupil of the condensing system, f is a focal distance, and n is a refractive index.

The condensing system comprises an objective lens 1 and an SIL (Solid Immersion Lens) 2. The objective lens 1 is equivalent to a condensing lens used in the general optical head. The SIL 2 is a hemisphere lens of which a spherical surface 2a faces the objective lens 1 and is arranged in such a manner that a distance between the objective lens 1 and a plane 2b is the same as the focal length of the objective lens 1. A laser beam 3 incident onto the objective lens 1 is condensed via the spherical surface 2a and the interior of the SIL 2 onto the plane 2b of the SIL, so that a condensed spot is formed on the plane 2b. The laser beam 3 is not refracted by the spherical surface 2a. For this reason, the numerical aperture of the condensing system shown in FIG. 1 is equivalent to that in a case where the objective lens 1 exists solely. On the other hand, the laser beam 3 is condensed through the interior of the SIL 2. Thus, when it is assumed that the refractive index of the SIL 2 is n, the wavelength of the laser beam 3 is 1/n times as long as the wavelength in a case where the objective lens 1 exists solely. Consequently, the diffraction limit, represented by the equation (1) is 1/n times as many as the case where the objective lens 1 exists solely.

According to the condensing system as mentioned above, it is possible to form a small diameter of the condensing spot. However, a major part of the condensed laser beam 3 is in an angle range of a total reflection by the plane 2b and thus cannot be propagated to the exterior of the SIL 2. On the other hand, the laser beam 3 has properties of an electric field and a magnetic field. The electric field and the magnetic field of the laser beam 3 condensed into a spot are projected out of the SIL 2 from the plane 2b. The electric field and the magnetic field projected out of the SIL 2 from the plane 2b are referred to as an optical near field.

According to the optical head using the condensing system shown in FIG. 1, when the plane 2b approaches a surface of a storage medium 4 up to about 100 nm, the optical near field is applied to the storage medium 4.

Figure 2:
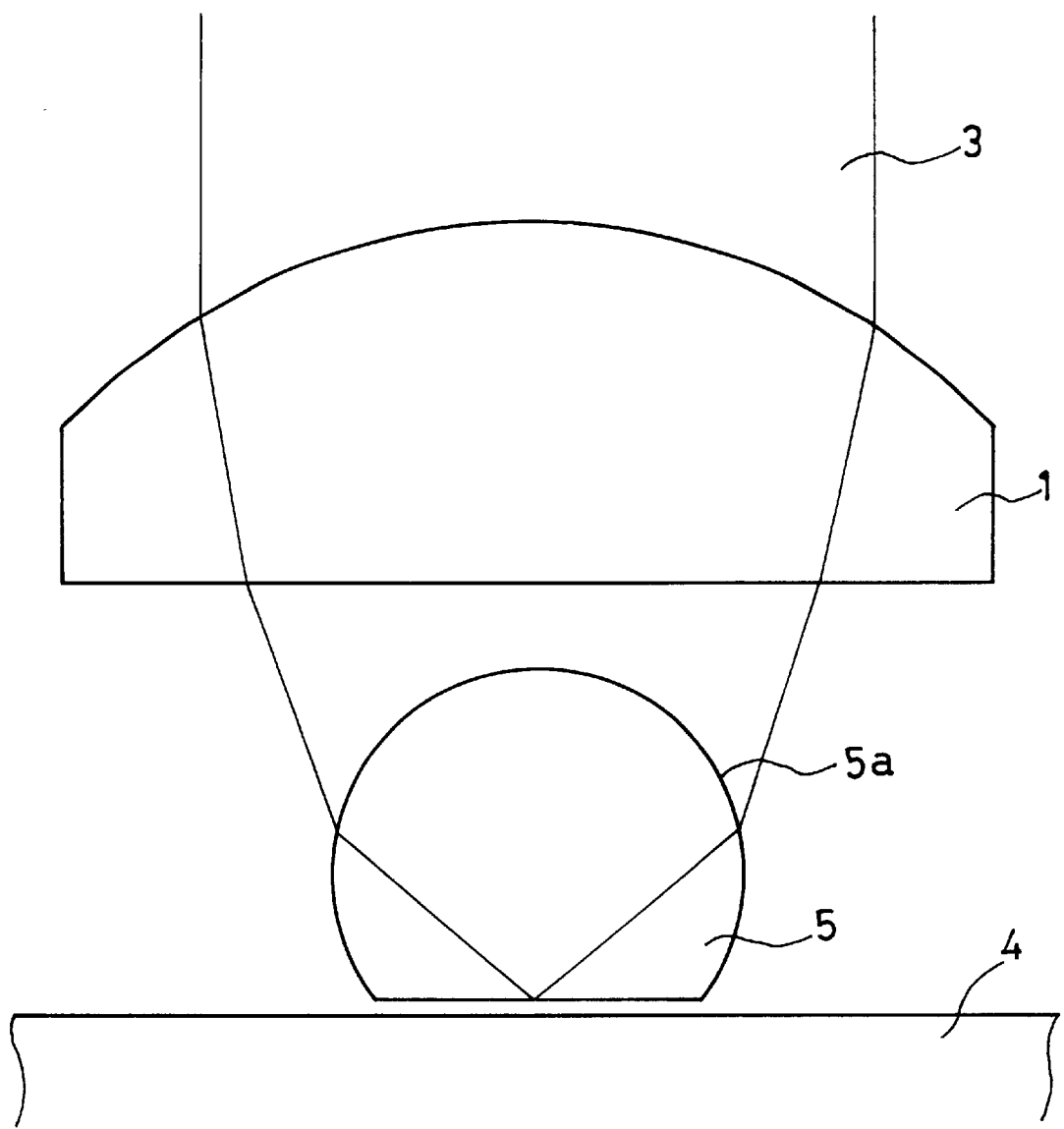
FIG. 2 is a conceptual view showing a comparative example using another condensing system which is small in diffraction limit per se.

FIG. 2 is a conceptual view showing a comparative example using another condensing system which is small in a diffraction limit per se.

According to the condensing system shown in FIG. 2, the SIL 2 of the condensing system shown in FIG. 1 is replaced by an SIL 5 of a hyper-hemisphere lens, so that the laser beam 3 is refracted by a spherical surface 5a of the SIL 5. As a result, the numerical aperture of the condensing system shown in FIG. 2 is 1/n times as that of the condensing system shown in FIG. 1. Therefore, the diffraction limit represented by the equation (1) is $1/n^2$ times as many as the case where the objective lens 1 exists solely to condense the laser beam.

In this manner, the use of a specific condensing system makes it possible to reduce the diffraction limit to some degree. However, a diameter of the spot is merely reduced to an extent of the wavelength of the laser beam.

As the above-mentioned technology in which the microscopic emitting outlet is used, there is proposed a technology in which an optical fiber subjected to a special processing is used to implement a spot diameter smaller than a wavelength of a laser beam.

Figure 3:
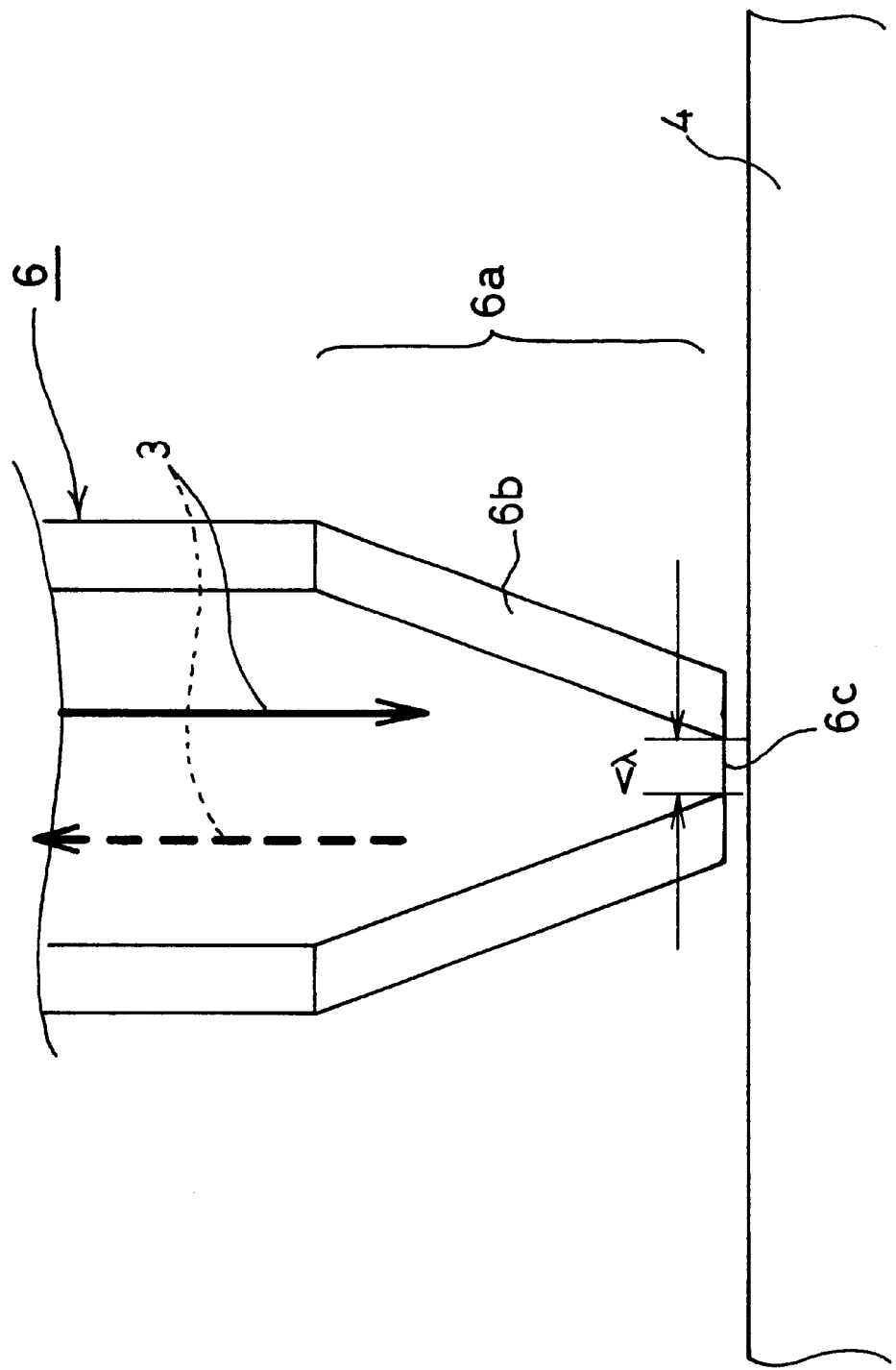
FIG. 3 is a conceptual view showing a comparative example using an optical fiber.

FIG. 3 is a conceptual view showing a comparative example using an optical fiber.

An end piece 6a of an optical fiber 6 is shaped as a cone. A reflection film 6b of aluminum is coated around the conic end piece 6a. The laser beam 3 is propagated inside the optical fiber 6 from the upper portion with respect to the figure and then condensed by the reflection film 6b. On the tip of the conic end piece 6a, there is provided an exit surface 6c having a diameter smaller than a wavelength λ0 of the laser beam 3 so that a spot diameter smaller than a wavelength λ of the laser beam 3 can be physically implemented.

Since the diameter of the exit surface 6c is smaller than a wavelength λ of the laser beam 3, the laser beam 3 cannot be propagated out of the optical fiber 6 from the exit surface 6c. For this reason, in a similar fashion to that of the explanation made referring to FIG. 1, the exit surface 6c moves close to a surface of the storage medium 4 so that the optical near field is applied to the storage medium 4.

The laser beam 3 reflected by the storage medium 4 is propagated inside the optical fiber upward with respect to the figure.

In this manner, in principle, it is possible to implement a condensed spot of which a diameter is smaller than a wavelength of the laser beam by means of forming the exit surface 6c of which a diameter is small than a wavelength of the laser beam. However, indeed, it is difficult to form such an exit surface 6c on the tip of the optical fiber 6. And thus, there is required a drastic change in a processing technology of the optical fiber.

Hereinafter, there will be described a principle of the present invention.

Figure 4:
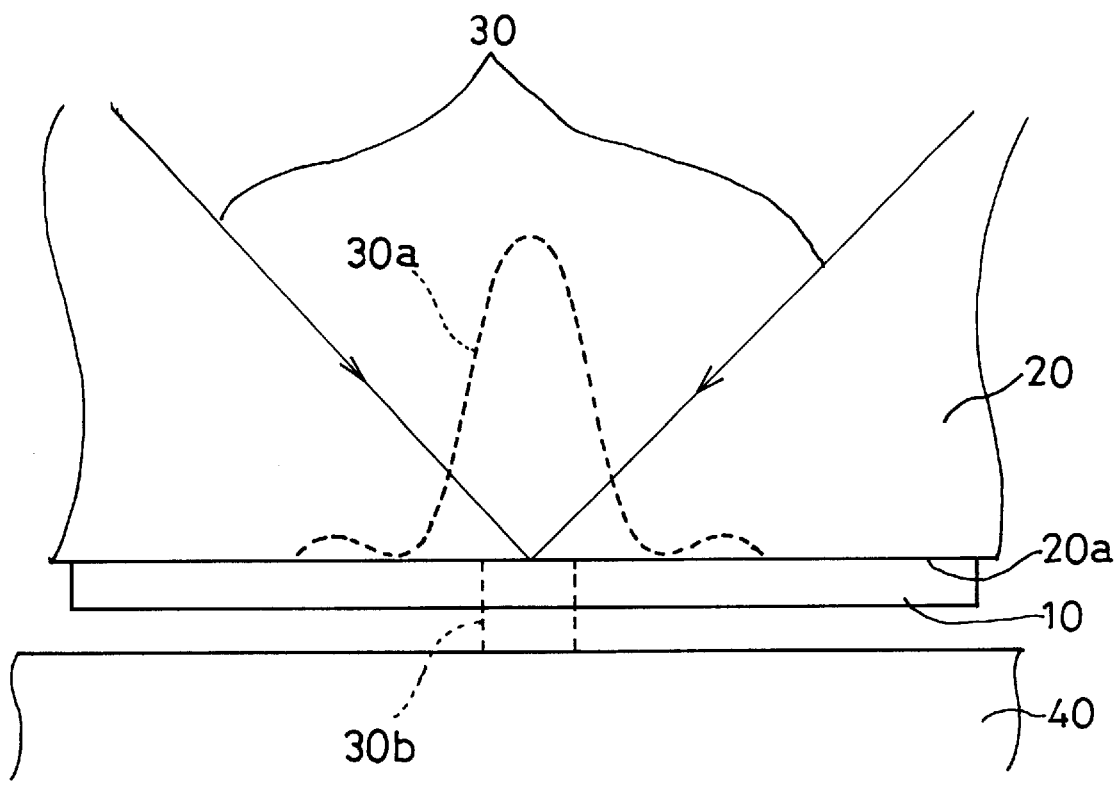
FIG. 4 is an explanatory view useful for understanding a principle of the present invention.

FIG. 4 is an explanatory view useful for understanding a principle of the present invention.

FIG. 4 shows a part of an optical component 20 having an exit surface 20a covered with a transmission film 10 which permits an incident light to be transmitted at the higher transmittance with the higher intensity of the incident light. A thickness of the transmission film 10 is not greater than a wavelength of the incident light. As the material of the transmission film 10, there are considered, for example, antimony having properties such that it generates heat through absorbing part of the incident light, and when it exceeds a predetermined temperature, it offers rapidly high transmittance, and phthalocyanine which is an example of a saturable absorber wherein with a low intensity of an incident light, the incident light is absorbed at a high absorbency index, and with a high intensity of an incident light in some degree, the absorption is saturated and the absorbency index is rapidly lowered. To form the transmission film 10, an evaporation and a spatter, which are general in a method of forming an optical thin film, are applicable. Consequently, it is easy to form a film with a thickness less than a wavelength. As a material of the optical component 20, there is considered glass and the like.

FIG. 4 shows also a state that the laser beam 30 is condensed on an exit surface 20a. The condensed laser beam 30 forms a condensed spot of which a diameter is a degree of a wavelength of the laser beam 30. A dotted line 30a is representative of an intensity distribution of the condensed laser beam 30 in which a peak of the light intensity exists near the center of the condensed spot. An optical near field existing near the exit surface 20a offers an intensity distribution according to the intensity distribution represented by the dotted line 30a. The optical near field is transmitted through the transmission film 10 near the center of the condensed spot, and is blocked off by the transmission film 10 at the periphery of the condensed spot. In other words, the transmission film 10 serves to reduce a diameter of the condensed spot. As a result, the optical near field transmitted through the transmission film 10 forms, as shown with a dotted line 30b, a condensed spot of which a diameter is smaller than a wavelength of the laser beam 30.

The optical component 20 comes close to a storage medium 40 up to about 100 nm in distance between a surface of the storage medium 40 and the exit surface 20a so that an optical near field forming the condensed spot shown with the dotted line 30b is applied to the storage medium 40. As a result, there is performed read and write according to the condensed spot of which a diameter is smaller than a wavelength of the laser beam 30.

Figure 7:
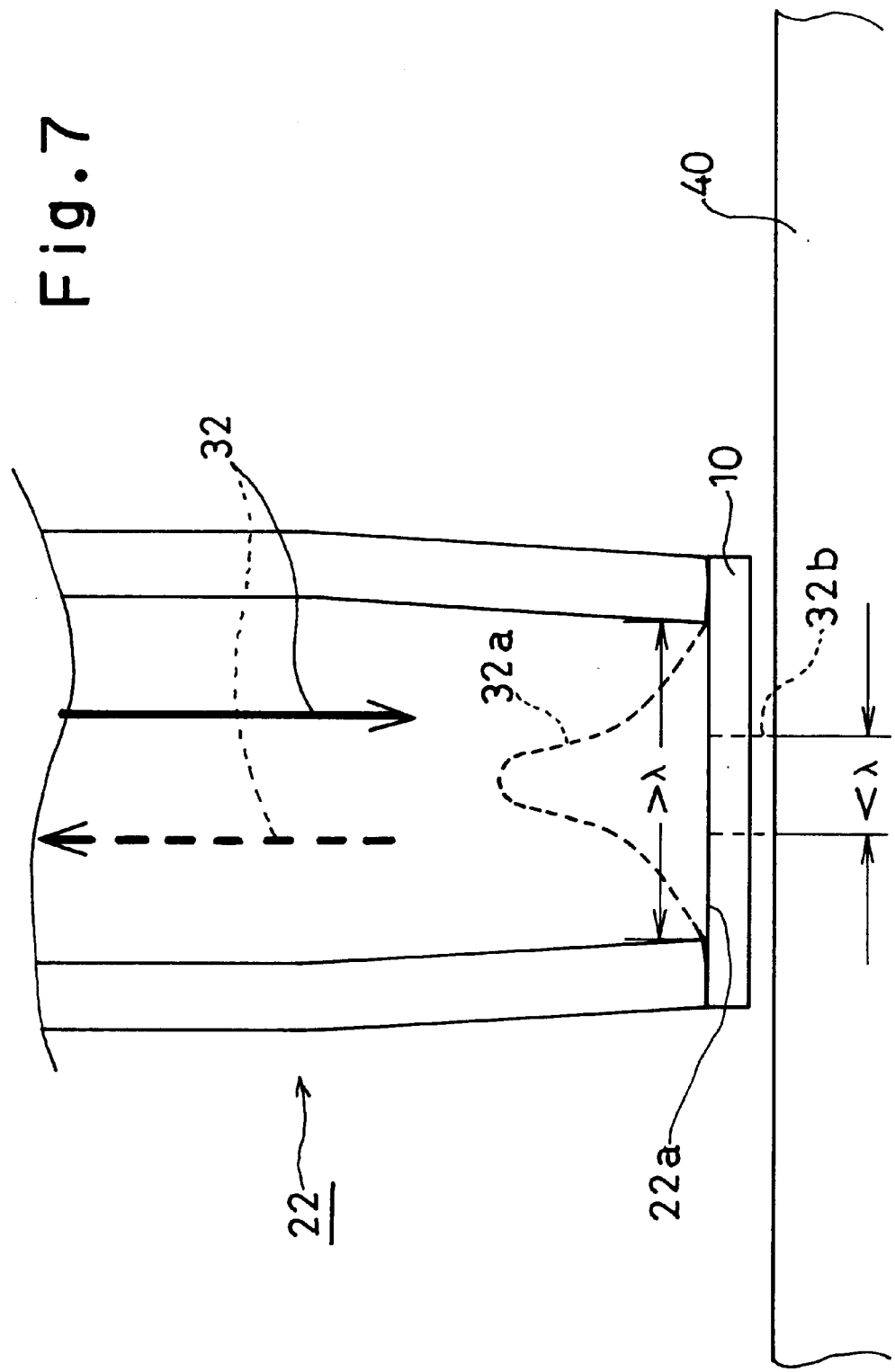
FIG. 7 is a conceptual view of an optical head in which the principle of the present invention is applied to an optical fiber.
Figure 8:
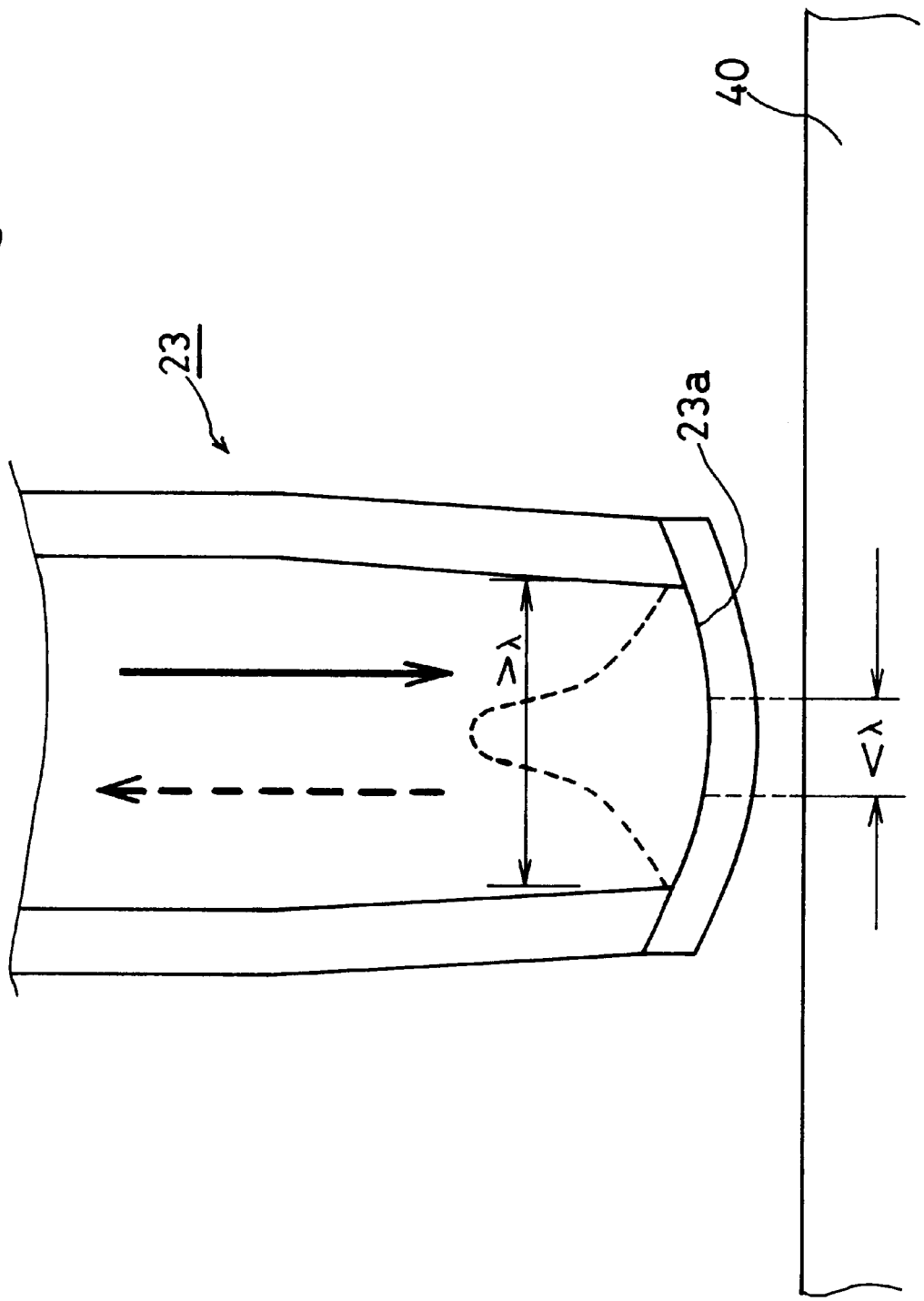
FIG. 8 is a conceptual view of an alternative optical head in which the principle of the present invention is applied to an optical fiber.

Next, there will be explained an embodiment of an optical head to which the principle of the present invention as mentioned above is applied. It is noted that the following FIGS. 5, 7 and 8 show only an exit surface and its environs of the optical head, but omit a light emission unit and an incident surface referred to in the present invention.

Figure 5:
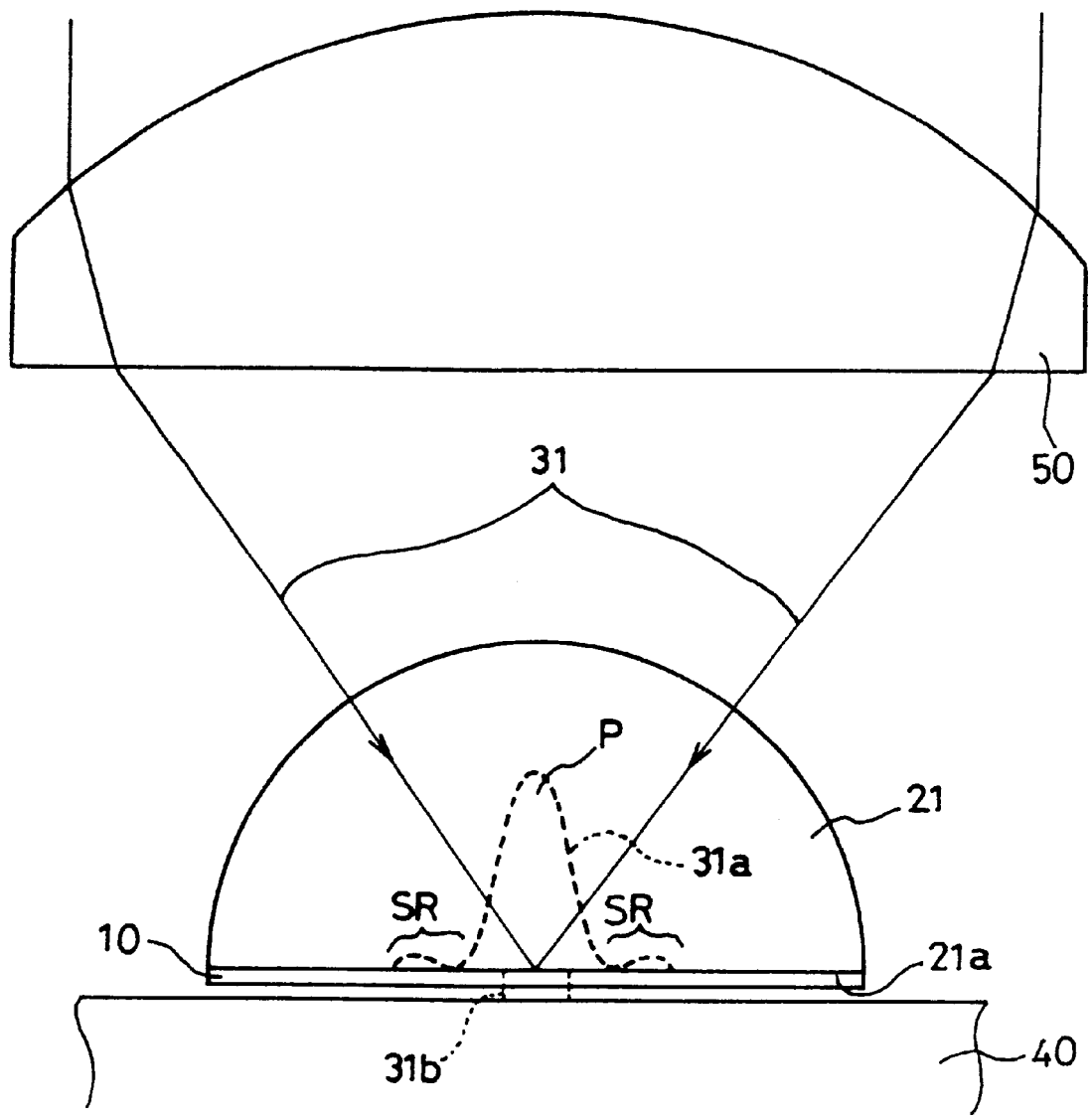
FIG. 5 is a conceptual view of an optical head in which the principle of the present invention is applied to the condensing system shown in FIG. 1.

FIG. 5 is a conceptual view of an optical head in which the principle of the present invention as mentioned above is applied to the condensing system shown in FIG. 1.

FIG. 5 shows a condensing system similar to FIG. 1 except for provision of the transmission film 10. A combination of an objective lens 50 and an SIL 21, or the SIL 21 are an example of the optical component referred to in the present invention.

In the condensing system shown in FIG. 5, when considering a manufacturing error of components and a control error at the time of working of an apparatus, on the light intensity distribution shown with the dotted line 31a with respect to a condensed spot formed on the exit surface 21a through condensing the laser beam 31, a peak P occurs at the center of the condensed spot and side lobes SR occur around the peak P. The light intensity of the side lobe SR is at most 30% or so with respect to the peak P. However, the side lobe SR causes noises and a cross talk to occur when information is read, and on the other hand, the side lobe SR causes a cross write to occur when information is written. It is to be noted that the substantial diameter of the condensed spot including such a side lobe is large.

As will be described hereinafter, the optical near field associated with the side lobe is blocked off by the transmission film 10, and only the optical near field associated with the peak P is transmitted through the transmission film 10 and is applied to the storage medium 40.

Figure 6:
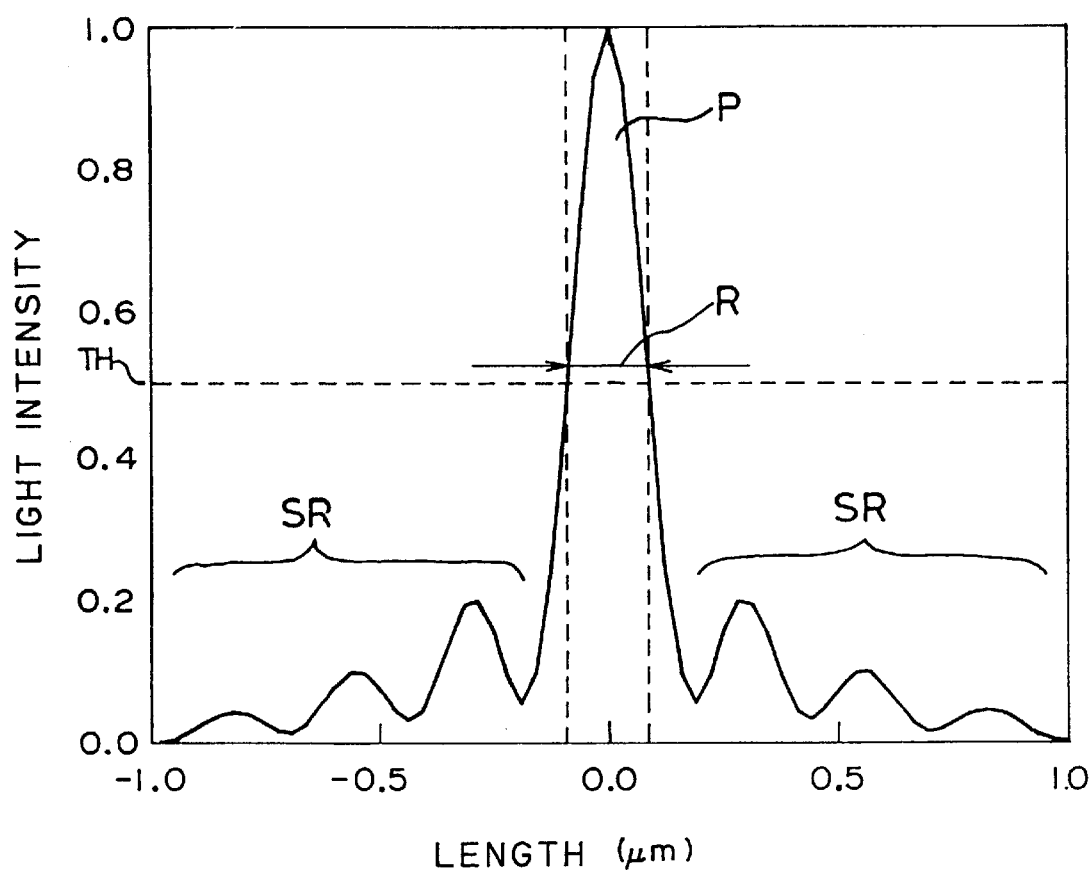
FIG. 6 is a graph showing a simulation result of a condensed spot formed by the optical head shown in FIG. 5.

FIG. 6 is a graph showing a simulation result of a condensed spot formed by the optical head shown in FIG. 5.

The graph shows a simulation result of a light intensity distribution of a condensed spot formed on the exit surface 21a shown in FIG. 5 through condensing the laser beam 31. It is simulated under the condition that a wavelength of the laser beam 31 is 633 nm, a numerical aperture of the objective lens is 0.8, and a refractive index of the SIL 21 is 1.8. The axis of abscissas of the graph denotes a distance from the center of the condensed spot. The axis of ordinates denotes a relative light intensity wherein a light intensity at the center of the condensed spot is [1.0]. Near the center of the condensed spot, the peak P of 0.165 μm in half-width exists. Around the peak P, side lobes SR having a light intensity of about 20% or so of the peak P exist.

In the event that the transmission film 10 shown in FIG. 5 is made of a material wherein when an incident light intensity exceeds a predetermined threshold, a transmission light intensity is rapidly increased, for example, the above-mentioned antimony and phthalocyanine, and the thickness of the film is adjusted in such a manner that the threshold TH is half or so of the light intensity of the peak P, the optical near field associated with the side lobe is blocked off by the transmission film 10, and only the optical near field associated with the peak P is transmitted through the transmission film 10. As a result, a diameter R of a spot on the optical near field transmitted through the transmission film 10 becomes a very small diameter such as about a quarter or so of the wavelength of the laser beam.

It is possible to control the threshold TH of the incident light intensity wherein the transmittance of the film is varied, by changing the thickness of the transmission film 10. In case of a film using a material such as antimony which varies in its transmittance in accordance with a temperature, increasing a thickness of the film involves a larger heat capacity of the film, so that a ratio of temperature rise of the film by the incident light is lowered. Thus, it is possible to establish a high threshold of the incident light intensity. Oppositely, decreasing a thickness of the film involves an enhancement of a ratio of temperature rise of the film. Thus, it is possible to establish a low threshold of the incident light intensity. On the other hand, in case of a film using a material of saturable absorber such as phthalocyanine, a saturated light intensity is simply proportional to a thickness of the film. Consequently, increasing a thickness of the film makes it possible to enhance a threshold wherein the transmittance of the film is varied with respect to the incident light intensity. Oppositely, decreasing a thickness of the film makes it possible to lower the threshold. To form the transmission film 10, an evaporation and a spatter, which are general in a method of forming an optical thin film, are applicable. Thus, a thickness of the film can be easily controlled.

FIG. 7 is a conceptual view of an optical head in which the principle of the present invention is applied to an optical fiber.

FIG. 7 shows an optical fiber 22 of which one end has an exit surface 22a covered by the transmission film 10. The optical fiber 22 tapers off to the one end on which the exit surface 22a is provided. The laser beam 32 is propagated inside the optical fiber 22 from the upper portion with respect to the figure and then condensed on the exit surface 22a by the tapered configuration. A diameter of the exit surface 22a is larger than a wavelength λ of the laser beam 32. Such an optical fiber 22 is easy to be fabricated.

FIG. 7 further shows with a dotted line 32a a light intensity distribution of the laser beam 32 propagated inside the optical fiber 22 wherein a peak of the light intensity exists at the center and its environs of the exit surface 22a.

A strong optical near field, which exists at the center and its environs of the exit surface 22a, is transmitted through the transmission film 10 and applied to a storage medium 40. On the other hand, a weak optical near field, which exists around the exit surface 22a, is blocked off by the transmission film 10. As a result, it is possible to implement a spot diameter smaller than a wavelength λ of the laser beam 32 as shown with a dotted line 32b.

The laser beam 32 reflected on the storage medium 40 is propagated inside the optical fiber 22 to the upper portion with respect to the figure.

FIG. 8 is a conceptual view of an alternative optical head in which the principle of the present invention is applied to an optical fiber.

An optical fiber 23 shown in FIG. 8 is similar to the optical fiber 22 shown in FIG. 7 except for a point that a convex (凸) exit surface 23a is provided. And a redundant description will be omitted.

It is known that the strong optical near field exists in the vicinity of such a convex (凸) exit surface. The use of the optical fiber 23 shown in FIG. 8 makes it possible to apply the strong optical near field to the storage medium 40.

Next, there will be explained an optical memory apparatus according to an embodiment of the present invention.

Figure 9:
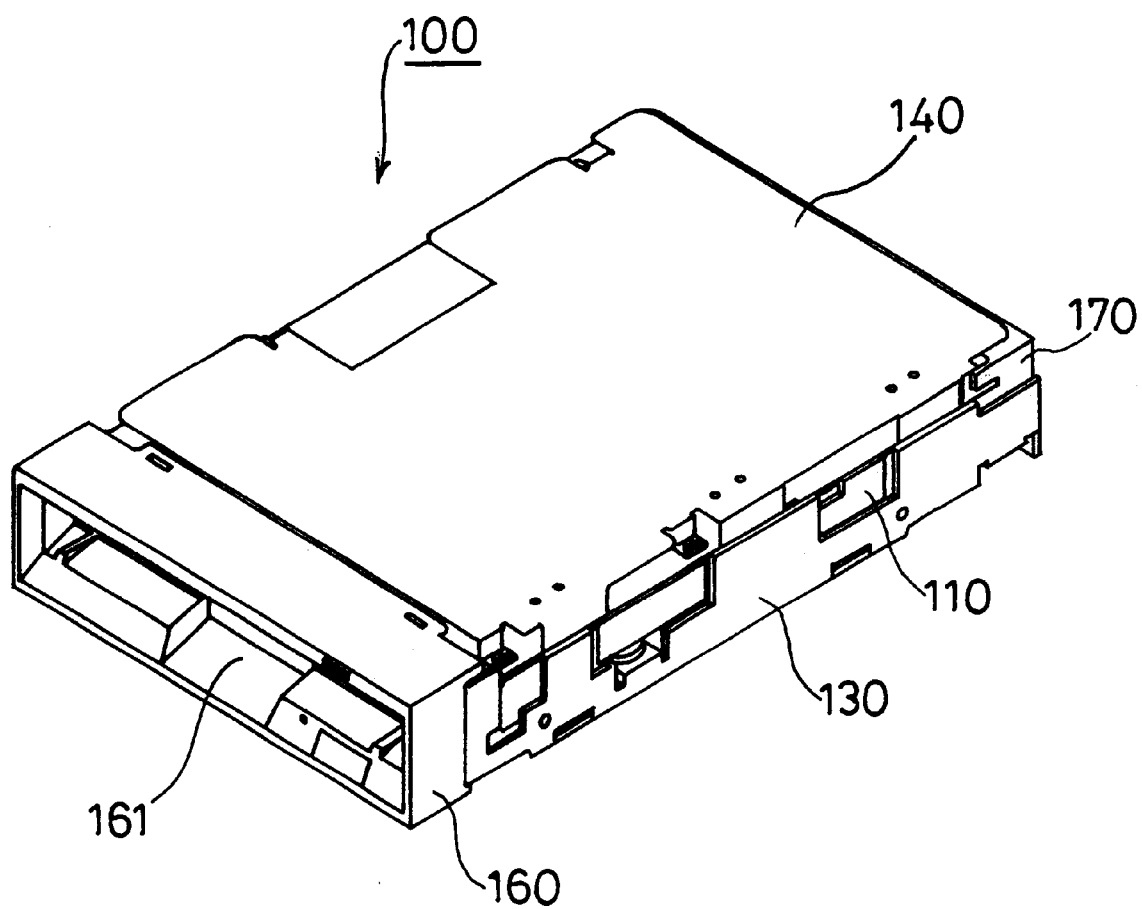
FIG. 9 is a perspective view of an optical memory apparatus according to an embodiment of the present invention looking from the front end.
Figure 10:
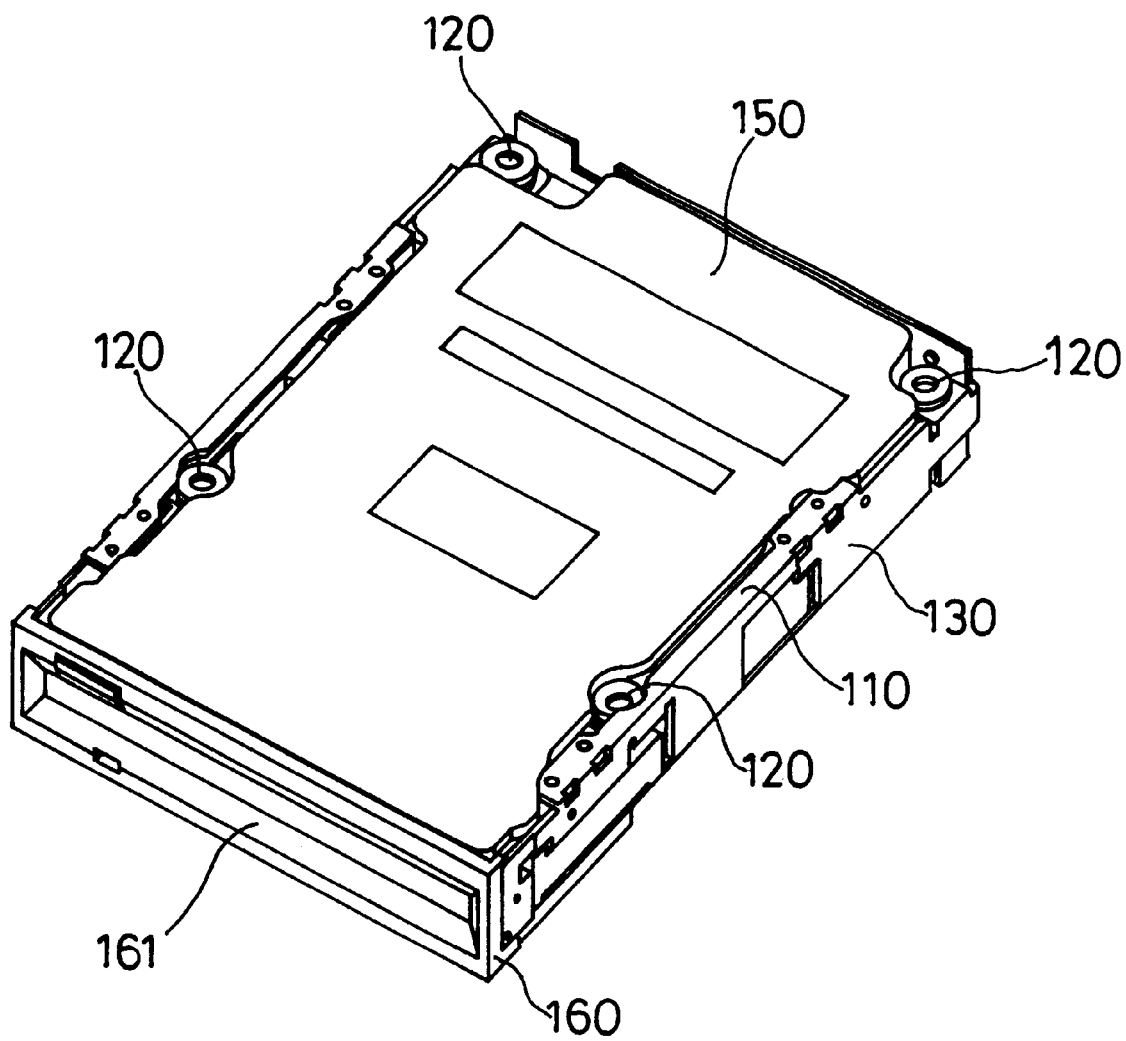
FIG. 10 is a perspective view of an optical memory apparatus according to an embodiment of the present invention looking from the rear end.

FIG. 9 is a perspective view of an optical memory apparatus according to an embodiment of the present invention looking from the front end. FIG. 10 is a perspective view of an optical memory apparatus according to an embodiment of the present invention looking from the rear end.

An optical memory apparatus 100 is provided with a drive base 110 made of aluminum alloy which serves as a base of the optical memory apparatus 100. The drive base 110 is mounted on a frame 130 through four rubber cushions 120. A top cover 140 and a bottom cover 150 are fixed on the drive base 110 by screws.

A front panel 160 is mounted on the frame 130. On the front panel 160, there is provided an insertion hole for inserting into the optical memory apparatus 100 an optical disk cartridge incorporating thereinto an optical disk which is an example of the storage medium referred to in the present invention.

On the back end of the optical memory apparatus 100 opposite to the front end thereof on which the front panel 160 is mounted, there is loaded a connector 170 for electrically connecting the optical memory apparatus 100 with an equipment such as a computer.

Figure 11:
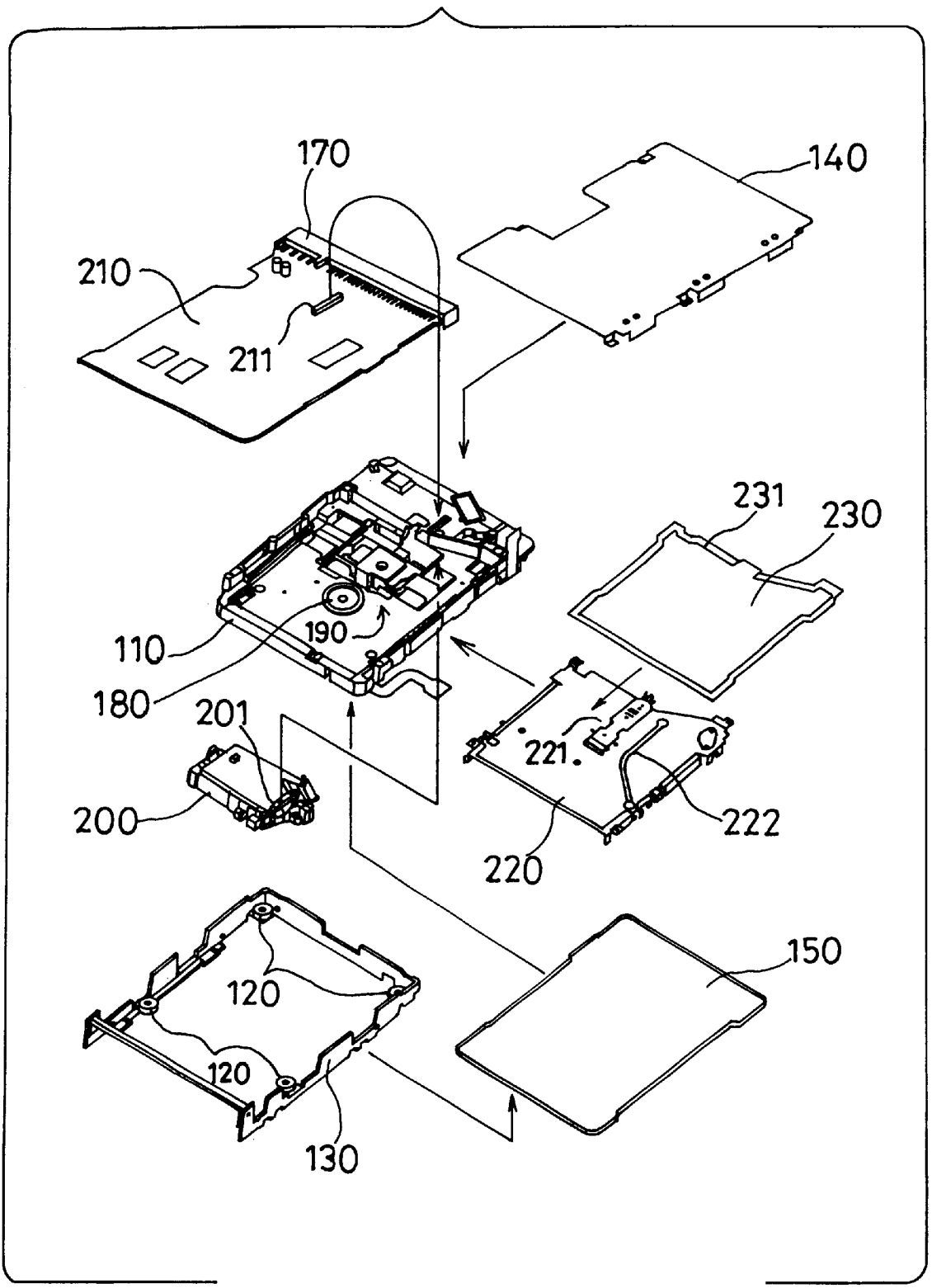
FIG. 11 is an exploded perspective view of the optical memory apparatus.

FIG. 11 is an exploded perspective view of the optical memory apparatus shown in FIGS. 9 and 10.

On the drive base 110 there is loaded a spindle motor 180 for holding and rotating an optical disk. The spindle motor 180 is an example of the storage medium holding mechanism referred to in the present invention.

Further, on the drive base 110 there is loaded an optical head comprising a movable optical assembly 190 movable in a radius direction of the optical disk, and a fixed optical assembly 200 fixed on the drive base 110. Specifically, the fixed optical assembly 200 is fixed at the back end of the drive base 110. On the fixed optical assembly 200, there is provided a connector 201 for electrically connecting with a printed-wiring board 210 which will be described later.

An optical disk cartridge loading assembly 220 comprises a bias magnet assembly 221 for turning on and off a bias magnetic field applied to the optical disk by sliding a permanent magnet, and a switching arm 222 for opening and closing a shutter of an optical disk cartridge. The optical disk cartridge loading assembly 220 is fixed on the drive base 110 at its front side. On the front side of the optical disk cartridge loading assembly 220, an insulating sheet 230 is loaded. And around the insulating sheet 230, there is mounted a seal member 231 for preventing dust from adhering to the optical disk by means of enhancing a sealing performance.

On the rear end of the printed-wiring board 210 including a driving control circuit for controlling a drive of the optical head and the like, there are loaded a connector 211 for connecting with the connector 201 of the fixed optical assembly 200 and a connector 170 for electrically connecting with an external equipment. The printed-wiring board 210 is loaded on the driver base 110 from the top of the insulating sheet 230 so that connector 211 of the printed-wiring board 210 is connected with the connector 201 of the fixed optical assembly 200. And the printed-wiring board 210 is fixed on the drive base 110 by screws.

Further, a top cover 140 is fixed on the drive base 110 by screws from the top of the printed-wiring board 210. And at the rear end of the drive base 110 a bottom cover 150 is fixed on the drive base 110 by screws. Finally, the drive base 110 is mounted on a frame 130 via rubber cushions 120.

Figure 12:
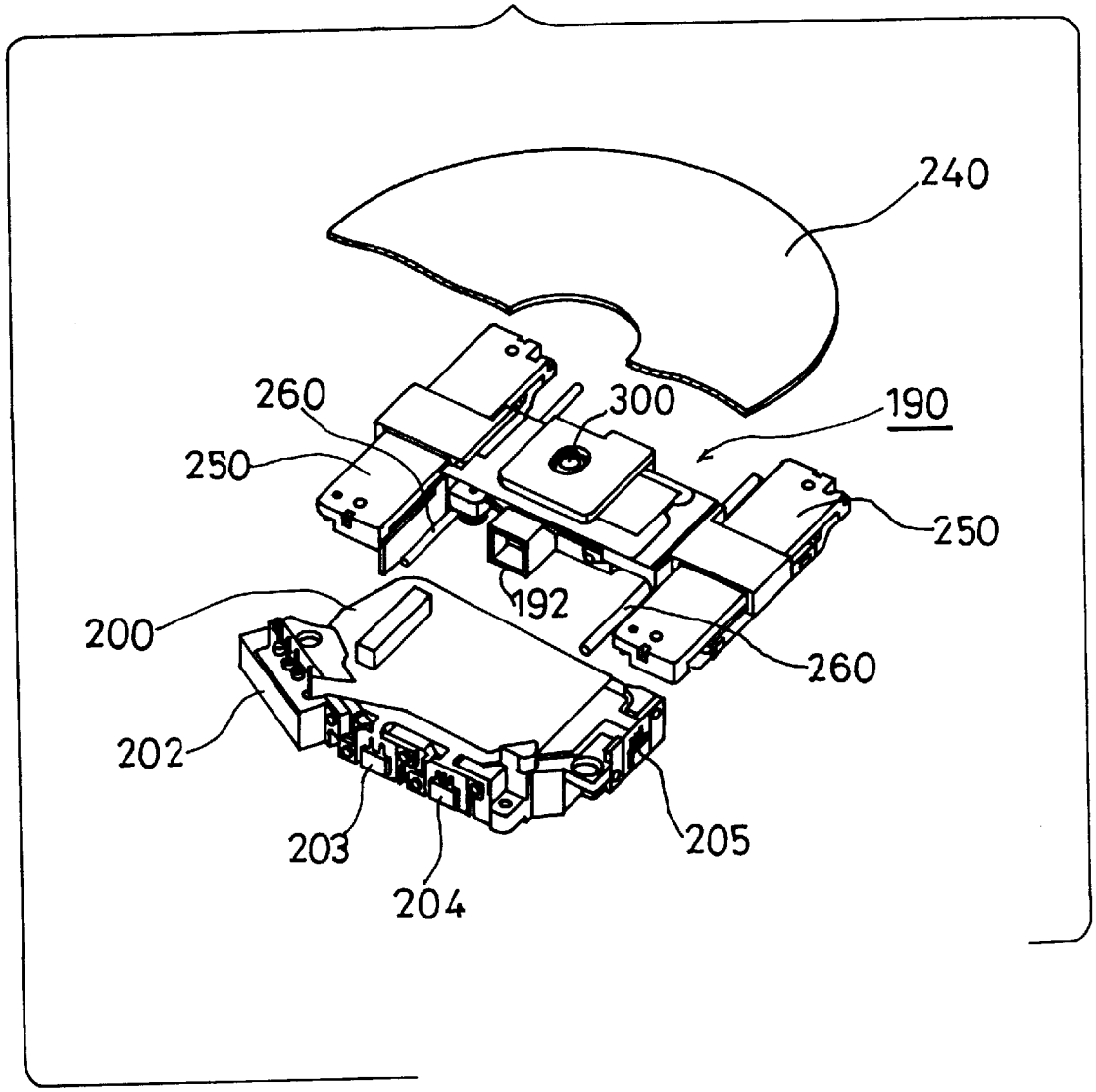
FIG. 12 is an illustration showing an arrangement relation between a fixed optical assembly and a movable optical assembly.

FIG. 12 is an illustration showing an arrangement relation between the fixed optical assembly and the movable optical assembly.

On the fixed optical assembly 200, there are mounted a laser diode 202 for generating laser beams used for reading and writing information, which is an example of the light emission unit referred to in the present invention; a photo detector 203 for detecting a signal according to information stored in an optical disk 240 on which light is reflected; a photo detector 204 for detecting a shift of a condensed spot with respect to a concentric track provided on the optical disk 240 as a place for storing information in accordance with a manner which will be described later; and a photo detector 205 for detecting a defocusing of a condensed spot in accordance with a manner which will be described later.

The movable optical assembly 190 is driven by a pair of magnetic circuits 250 to move in a radius direction of the optical disk 240 along a pair of guide rails 260. The movable optical assembly 190 incorporates thereinto an actuator for controlling a focus of a condensed spot and positioning the condensed spot on the track by means of performing a fine control for positions of an objective lens and an SIL 300. The pair of magnetic circuits 250 and the actuator are an example of the optical head driving mechanism referred to in the present invention. The movable optical assembly 190 is provided with an aperture 192 of a four-side figure in section. A laser beam emitted from the laser diode 202 of the fixed optical assembly 200 and formed into parallel rays enter from the aperture 192

Figure 13:
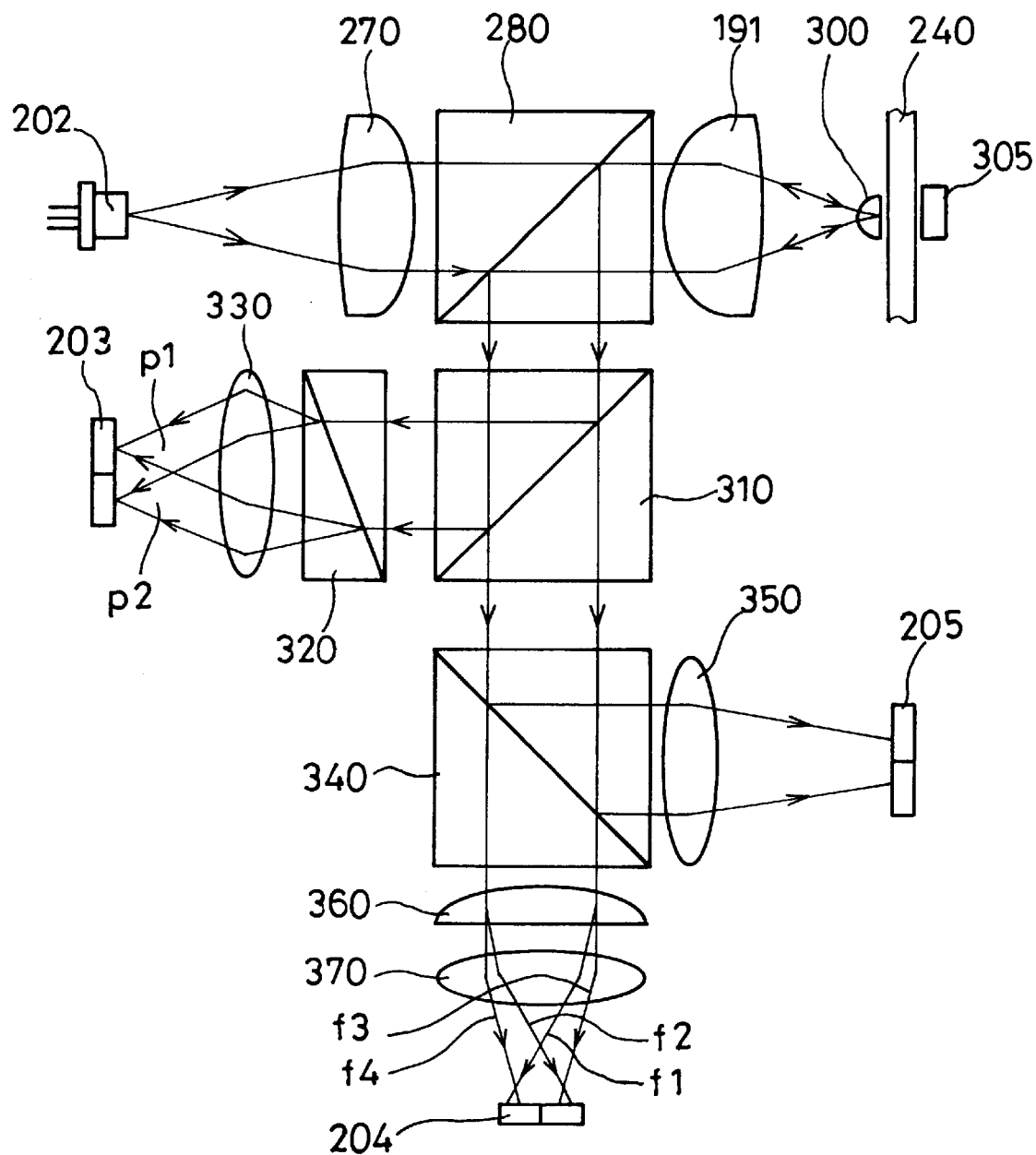
FIG. 13 is a construction view of an optical system of an optical head.

FIG. 13 is a construction view of an optical system of an optical head comprising the fixed optical assembly and the movable optical assembly shown in FIG. 12.

A laser beam emitted from a laser diode 202 of the fixed optical assembly is incident onto a polarization beam splitter 280 in the form of a parallel ray through a collimating lens 270. The laser beam emitted from the laser diode 202 is polarized. Thus, the laser diode 202 is disposed in such a manner that a polarization direction of the polarized beam becomes a polarization direction passing through the polarization beam splitter 280. Thus, the laser beam incident onto the polarization beam splitter 280 passes through the polarization beam splitter 280 and is incident onto an objective lens 191 of the movable optical assembly. The optical head is separated into the movable optical assembly and the fixed optical assembly between the polarization beam splitter 280 and the objective lens 191. a laser beam incident onto the objective lens 191 is condensed by the objective lens 191 and applied via the SIL 300 to the optical disk 240.

When information is written, a bias magnetic field is applied by the permanent magnet 305 so that the laser diode 202 is subjected to an output modulation according to information to be written. When information is read, the bias magnetic field is turned off. As a result, an output of the laser diode 202 is kept constant.

The laser beam reflected on the optical disk 240 returns via the SIL 300 and the objective lens 191 to the polarization beam splitter 280, and the majority of the beam passes through the polarization beam splitter 280 again. However, of the laser beam, a part subjected to rotation in the polarization direction by Kerr effect caused by the polarization beam splitter 280 and is incident onto a beam splitter 310.

The beam splitter 310 splits the incident beam at a predetermined ratio. Part of the split beam are used for detection of a signal included in the beam reflected on the optical disk 240, which will be described hereinafter.

The part of the split beam by the beam splitter 310 are further separated by an analyzer 320 into a component p1 in which a polarization direction is rotated in a predetermined plus direction by Kerr effect and a component p2 in which a polarization direction is rotated in a minus direction with respect to the plus direction. And then, beams of the components p1 and p2 are condensed by a condensing lens 330 on the associated locations on a detecting surface of the photo detector 203, respectively. The detecting surface of the photo detector 203 is divided into two parts. Beams of the components p1 and p2 are detected by the parts thus divided, respectively, so that the respective detected signals are obtained. A difference between the detected signals corresponds to the signal included in the beam reflected on the optical disk 240.

Another part of the split beam by the beam splitter 310 is further split at a predetermined ratio. A part of the split beam is used for detection of a shift of a condensed spot with respect to the track. Another part of the split beam is used for a focus control of the condensed spot, which will be described later.

The part of the split beam by the beam splitter 340 is condensed by a condensing lens 350 on a detecting surface of the photo detector 205. The detecting surface of the photo detector 205 is divided into two parts. The beam condensed on the detecting surface of the photo detector 205 is detected by the parts thus divided, respectively, so that the respective detected signals are obtained. A difference between the detected signals is used as a tracking error signal by a so-called push-pull scheme so that a shift of a condensed spot with respect to the track is detected.

Another part of the split beam by the beam splitter 340 is condensed by a cylindrical lens 360 and a spherical lens 370. Since the cylindrical lens 360 exists, a state of condensing of beam is different between a case where the beam is observed from a vertical direction of the figure and a case where the beam is observed from a horizontal direction of the figure. Arrows f1 and f2 in FIG. 13 show a state of condensing of beam in a case where the beam is observed from a vertical direction of the figure. The beam is refracted by the cylindrical lens 360 and the spherical lens 370, and focused before the detecting surface of the photo detector 204, and then applied to the detecting surface while diffusing. On the other hand, arrows f3 and f4 in FIG. 13 show a state of condensing of beam in a case where the beams are observed from a horizontal direction of the figure. The beam is passed by the cylindrical lens 360, and then refracted by the spherical lens 370 in such a manner that the beam is focused after the detecting surface of the photo detector 204. As a result, a shape of the beam formed on the detecting surface is generally an ellipse.

Figure 14:
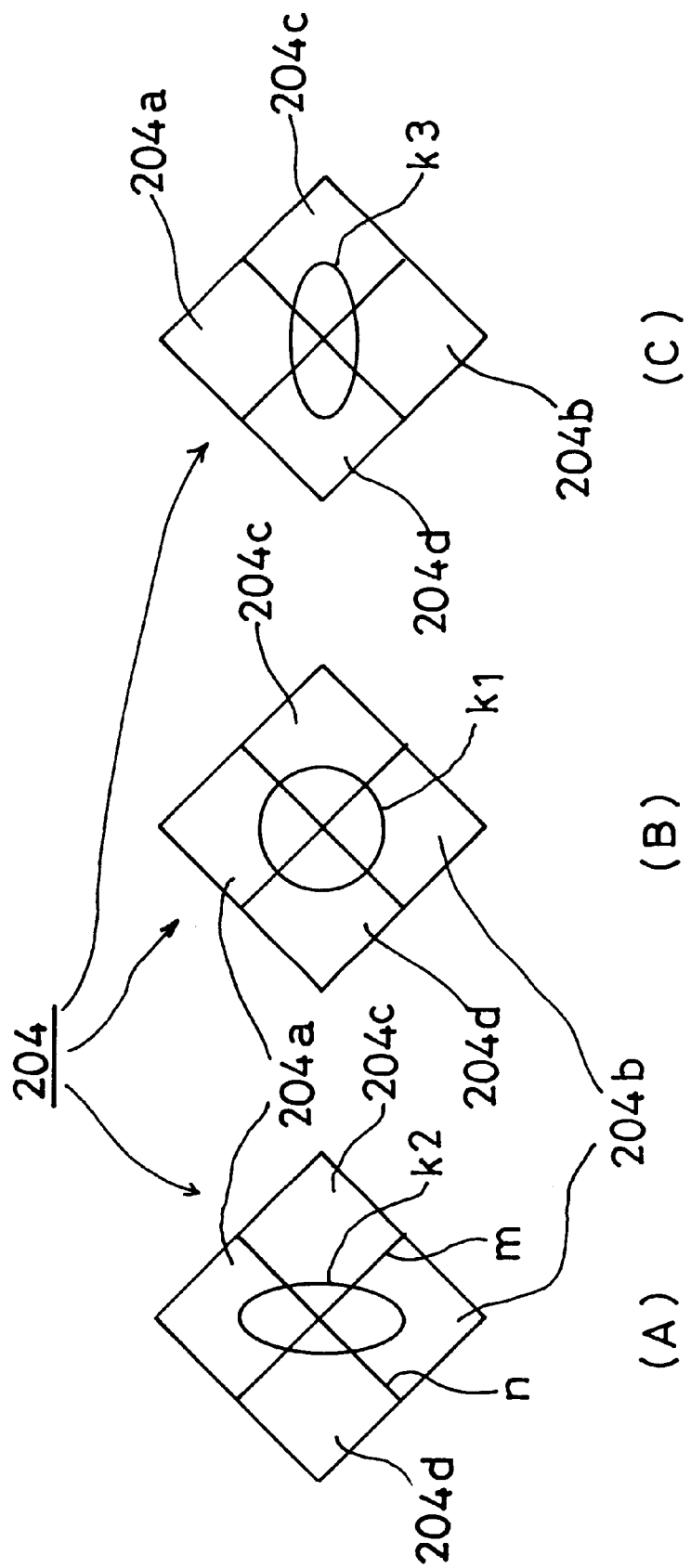
FIG. 14 is a view showing the state of beams of light applied to a detecting surface of a photo detector.

FIG. 14 is a view showing the state of the beam of light applied to a detecting surface of a photo detector.

The vertical direction in FIG. 14 corresponds to a depth direction in FIG. 13, and the horizontal direction in FIG. 14 corresponds to a horizontal direction in FIG. 13. The detecting surface of the photo detector 204 is a diamond-shaped one which is divided into four pieces by two lines m and n crossing as a mark "X". Part (B) of FIG. 14 shows a shape k1 of beam applied to the detecting surface in a case where the objective lens 191 shown in FIG. 13 is located at a position that a condensed spot is focused, wherein a position of the detecting surface is controlled in such a manner that the shape k1 of beam becomes a circle.

Part (A) of FIG. 14 shows a shape k2 of beam applied to the detecting surface in a case where the objective lens 191 is located at a position approaching the optical disk 240 from the position that a condensed spot is focused, wherein the shape k2 of beam becomes an ellipse extending in a vertical direction with respect to the figure. Part (C) of FIG. 14 shows a shape k3 of beam applied to the detecting surface in a case where the objective lens 191 is located at a position going away from the position that a condensed spot is focused, with respect to the optical disk 240, wherein the shape k3 of beam becomes an ellipse extending in a horizontal direction with respect to the figure.

Accordingly, it is possible to detect a shift of a focus by detecting a difference between a light quantity received by two segments 204a and 204b of the four-divided detecting surface and a light quantity received by two segments 204c and 204d of the four-divided detecting surface.

Figure 15:
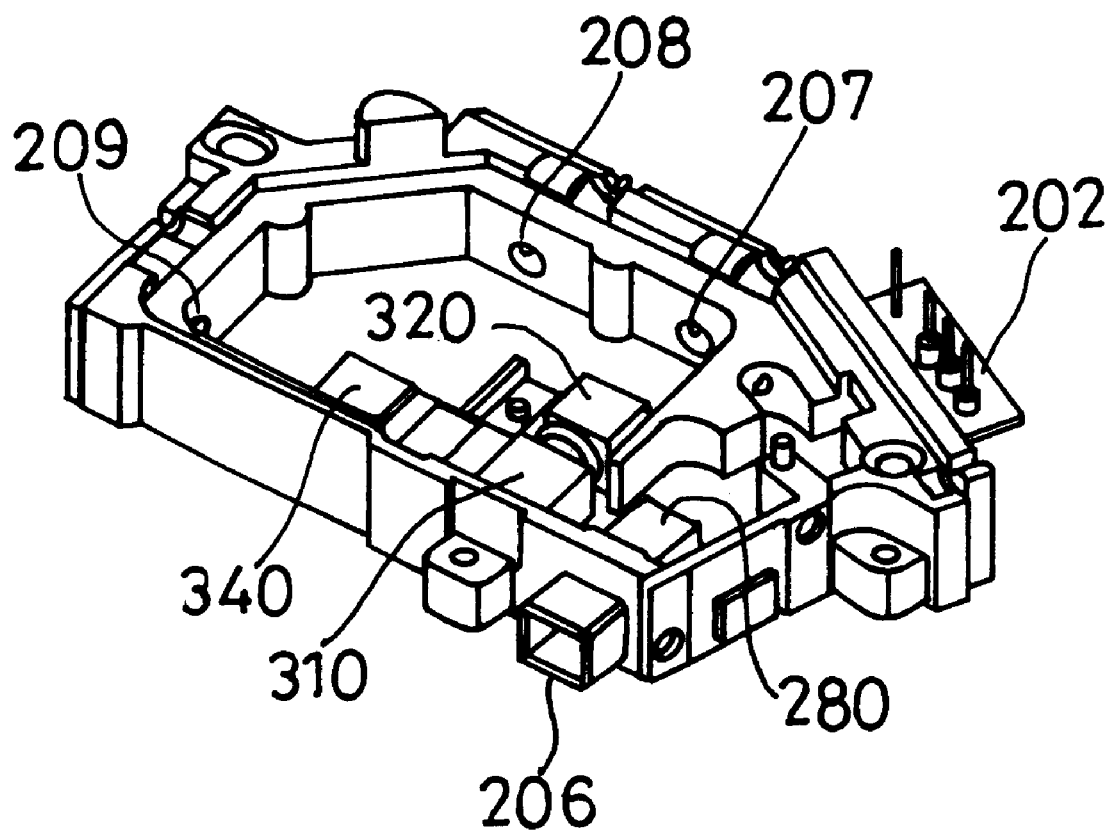
FIG. 15 is a perspective view showing an internal structure of the fixed optical assembly.

FIG. 15 is a perspective view showing an internal structure of the fixed optical assembly.

The fixed optical assembly 200 is provided an aperture 206 corresponding to the aperture 192 of the movable optical assembly 190 shown in FIG. 12. The polarization beam splitter 280 is disposed in depths of the aperture 206.

The laser beams emitted from the laser diode 202 are spread into the form of an ellipse. For this reason, the laser diode 202 is disposed obliquely with respect to an incident direction of the laser beams onto the polarization beam splitter 280. When the laser beams emitted from the laser diode 202 are refracted by a prism (omitted in FIG. 13), the laser beams are deformed into a circle, and then are incident onto the polarization beam splitter 280.

The laser beams passed through the polarization beam splitter 280 are transferred via the aperture 206 to the movable optical assembly 190. Part of the beams returned from the movable optical assembly 190 are reflected by the polarization beam splitter 280 left upward with respect to FIG. 15 as explained in FIG. 13.

At the center of the fixed optical assembly 200, there are disposed the beam splitters 310 and 340, the analyzer 320, etc. which are explained referring to FIG. 13. The beams reflected by the polarization beam splitter 280 left upward with respect to FIG. 15 pass through the beam splitters 310 and 340, the analyzer 320, etc., as described in connection with FIG. 13, and pass through holes 207, 208 and 209 provided on a frame of the fixed optical assembly 200, and reach the respective photo detectors.

It is important for a high density of optical memory apparatus to reduce a diameter of a spot irradiated onto a storage medium from an optical head and also to control an irradiation intensity to be constant. A variation of an irradiation intensity at the time of data writing brings about unevenness in an edge configuration on recording pits on the storage medium. This unevenness appears in the form of a jitter at the time of data reading, thereby increasing reading errors. It is indispensable for implementing stable recording and writing less error to control an irradiation light intensity onto the storage medium.

Figure 16:
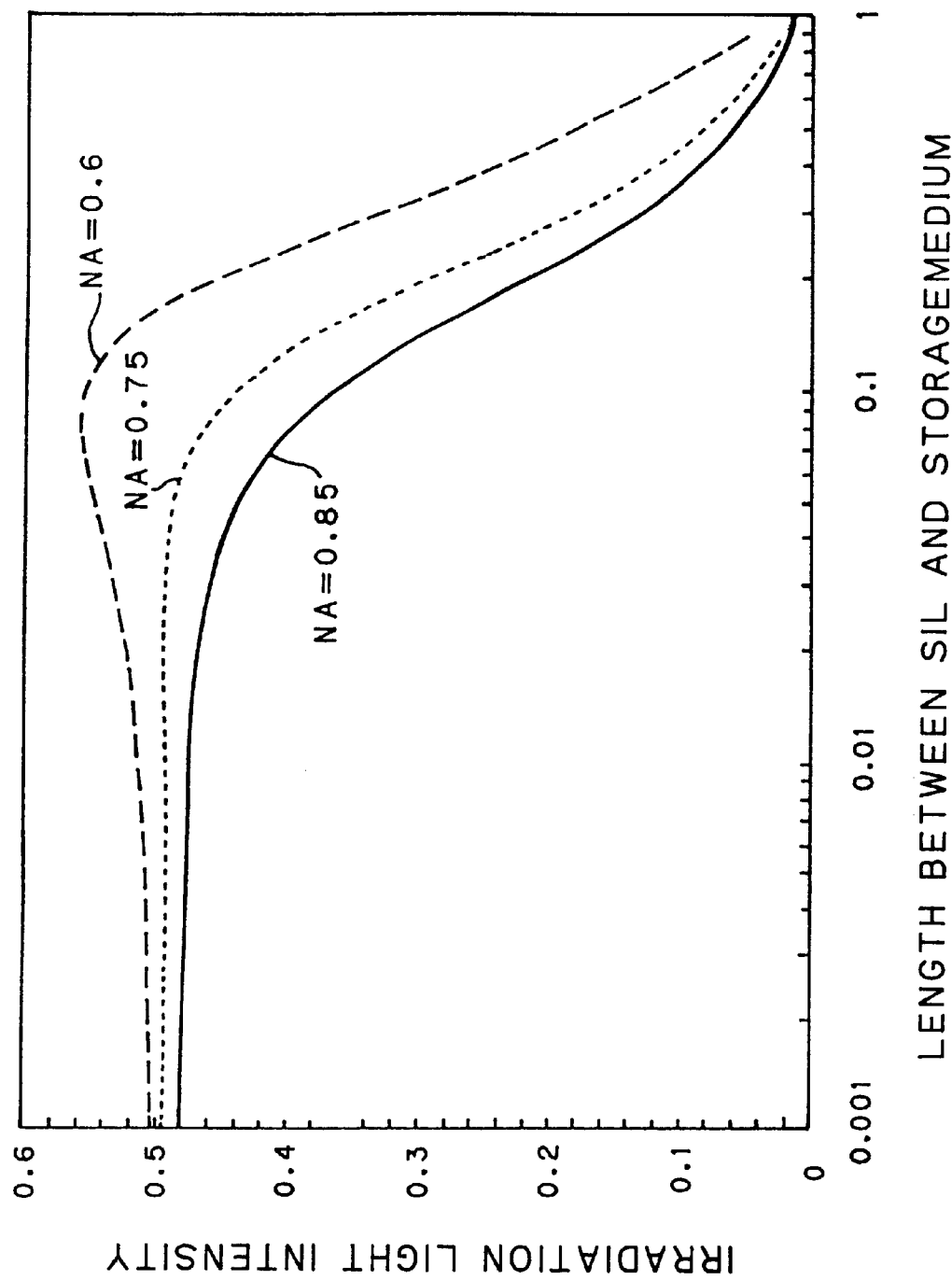
FIG. 16 is a graph showing a simulation result of irradiation light intensity.

FIG. 16 shows a simulation result of an irradiation light intensity on a storage medium by an optical head using an SIL. In this simulation, the use of a transmission film of the present invention is not supposed. However, this result is also applicable to a case where the film is used.

FIG. 16 is a graph showing a simulation result of irradiation light intensity.

FIG. 16 shows a simulation result of an irradiation light intensity, wherein a relation between a length between the SIL 21 and the storage medium 40 shown in FIG. 5 and a light intensity of irradiation onto the storage medium 40 is simulated. This is simulated under conditions of the refractive index of the SIL 21 being 1.88. With respect to the numerical aperture (N. A.) of the objective lens 50, the simulation was performed under conditions of three types of 0.6, 0.75, 0.85. Each of the graphs of the respective simulation results is shown with the associated value of the numerical aperture (N. A.). The axis of ordinates of FIG. 16 denotes an irradiation light intensity in a given unit. The axis of abscissas denotes a length between the SIL 21 and the storage medium 40 in unit of a wavelength of the laser beam 31.

In these simulations, there are considered not only the optical near field due to characteristics as the electric field or the magnetic field, which the laser beam 31 possesses, as mentioned above, but also a quantum-mechanical optical tunneling from the SIL 21 to the storage medium 40, which is due to characteristics as the photon, which the laser beam 31 possesses.

It is desired that the intensity of irradiated light to the storage medium 40 is stable even if a length between the SIL 21 and the storage medium 40 is varied somewhat. In other words, it is desired that the line of the graph is horizontal. Looking the graphs of FIG. 16 from a viewpoint of this, in the graph where the numerical aperture is 0.85, the line of the graph is drastically inclined right downward excepting for an unrealistic area such that a length between the SIL 21 and the storage medium 40 is less than one-hundredth of a wavelength of the laser beam 31. Thus, it is understood that the irradiation light intensity is not stable. On the other hand, in the graph where the numerical aperture is 0.75 or less, the line of the graph is substantially horizontal in an area that a length between the SIL 21 and the storage medium 40 is not more than one-tenth of a wavelength of the laser beam 31. Thus, it is understood that the irradiation light intensity is stable.

Accordingly, when the optical head using the objective lens where the numerical aperture is 0.75 or less is driven in a state that a length between the SIL 21 and the storage medium 40 is less than one-tenth of a wavelength of the laser beam 31, it is possible that read and write of information become stable and high density of read and write of information can be implemented.

The technology of FIG. 16 makes it possible to obtain a desired intensity even on the small spot by a combination with a technology of minimizing the diameter of the spot shown in FIG. 4. Thus, it is possible to implement stable read and write of information and also high density of read and write of information.

In the above description, there is explained an optical memory apparatus using the SIL. However, it is acceptable that the optical memory apparatus uses an optical fiber. In the event that the optical fiber is used, it is acceptable that the fiber is floated or mounted on a contact slider and a near recording reproducing is performed through floating or contacting with respect to a medium.

Further, it is acceptable that a fiber or a lens is held through coming close to a medium in accordance with the liner driving type scheme as shown in FIG. 12, or alternatively that the fiber or the lens is held and driven on a medium in accordance with a rotary driving type scheme (a swing arm scheme as the general hard disk drive).

Furthermore, according to the above description, there is explained the transmission film which is formed by the evaporation or the like. However, it is acceptable that the transmission unit or the transmission layer referred to in the present invention is formed as a layer by processing the optical part itself. In the event that the optical near field is utilized, it is desired that the transmission unit or the transmission layer is closely contacted with an exit surface of the optical part. However, in the event that the intensity is permitted to be lowered somewhat, it is acceptable that the transmission unit is a sheet-shaped one provided apart from the exit surface of the optical part.

As mentioned above, according to an optical head and a lens of the present invention, it is possible to form a condensed spot of which a diameter is smaller than a wavelength of light, and also it is easy in fabrication. And, according to an optical memory apparatus of the present invention, it is possible to perform read and write of information with respect to a storage medium at high density.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An optical head applying beams of light to a surface of the storage medium, said optical head comprising:

a light emission unit for emitting a light beam;

an optical part having an incident surface onto which the light beam is incident and an exit surface from which the light beam applied through the incident surface is emitted; and a transmission unit permitting part of a predetermined optical intensity or more of the light beam emitted from the exit surface of said optical part to pass through said transmission unit, wherein said transmission unit is made of a material in which part of an incident light energy is converted into a thermal energy, said material permitting an incident light to be transmitted at a higher transmittance with a higher temperature.

2. An optical head according to claim 1, wherein said optical part establishes a focus of the light beam on said exit surface.

3. An optical head according to claim 1, wherein said optical part is an optical fiber.

4. An optical head according to claim 3, wherein said optical fiber has said exit surface on one end of said optical fiber, said optical fiber having a configuration tapered toward the one end.

5. An optical head according to claim 3, wherein said optical fiber has a projecting exit surface on one end of said optical fiber.

6. An optical head applying beams of light to a surface of the storage medium, said optical head comprising:

a light emission unit for emitting a light beam;

an optical part having an incident surface onto which the light beam is incident and an exit surface from which the light beam applied through the incident surface is emitted; and a transmission unit permitting part of a predetermined optical intensity or more of the light beam emitted from the exit surface of said optical part to pass through said transmission unit, wherein said transmission unit is made of a saturable absorber having properties in which an absorbency index is lowered in accordance with an increment of an incident light intensity.

7. An optical head according to claim 6, wherein said optical part establishes a focus of the light beam on said exit surface.

8. An optical head according to claim 6, wherein said optical part is an optical fiber.

9. An optical head according to claim 8, wherein said optical fiber has said exit surface on one end of said optical fiber, said optical fiber having a configuration tapered toward the one end.

10. An optical head according to claim 8, wherein said optical fiber has a projecting exit surface on one end of said optical fiber.

11. An optical part comprising:
an incident surface onto which a light beam is incident;
an exit surface from which the light beam applied through said incident surface is emitted; and
a transmission unit permitting part of the light beam emitted from the exit surface to be transmitted at higher transmittance with higher light intensity, wherein said transmission unit is made of a material in which part of an incident light energy is converted into a thermal energy, said material permitting an incident light to be transmitted at a higher transmittance with a higher temperature.

12. An optical part comprising an incident surface onto which a light beam is incident, and an exit surface from which the light beam applied through said incident surface is emitted; and
a transmission unit permitting part of a predetermined optical intensity or more of the light beam emitted from the exit surface of said optical part to pass through said transmission unit, wherein said transmission unit is made of a saturable absorber having properties in which absorbency index is lowered in accordance with an increment of an incident light intensity.

13. An optical memory apparatus comprising:
a light emission unit for emitting a light beam;
an optical part having at least a transmission unit permitting part of a predetermined optical intensity or more of the light beam emitted from the light emission unit to pass through said transmission unit, wherein said transmission unit is made of a material in which part of an incident light energy is converted into a thermal energy, said material permitting an incident light to be transmitted at a higher transmittance with a higher temperature;
a storage medium holding mechanism for holding a storage medium, to which the part of the light beam is applied, at a predetermined position; and
an optical part driving mechanism for driving said optical part.

14. An optical memory apparatus according to claim 13, wherein said optical part driving mechanism drives said optical part in a state that the storage medium held by said storage medium holding mechanism and said transmission unit are spaced from one another by a length not more than a wavelength of the light beam.

15. An optical memory apparatus according to claim 13, wherein said optical part establishes a focus of the light beam on an exit surface.

16. An optical memory apparatus according to claim 13, wherein said optical part is an optical fiber.

17. An optical memory apparatus comprising:
a light emission unit for emitting a light beam;
an optical part having at least a transmission unit permitting part of a predetermined optical intensity or more of the light beam emitted from the light emission unit to pass through said transmission unit, wherein said transmission unit is made of a saturable absorber having properties in which an absorbency index is lowered in accordance with an increment of an incident light intensity;
a storage medium holding mechanism for holding a storage medium, to which the part of the light beam is applied, at a predetermined position; and
an optical part driving mechanism for driving said optical part.

18. An optical memory apparatus according to claim 17, wherein said optical part driving mechanism drives said optical part in a state that the storage medium held by said storage medium holding mechanism and said transmission unit are spaced from one another by a length not more than a wavelength of the light beam.

19. An optical memory apparatus according to claim 17, wherein said optical part establishes a focus of the light beam on an exit surface.

20. An optical memory apparatus according to claim 17, wherein said optical part is an optical fiber.

21. An optical memory apparatus comprising:
a light emission unit for emitting a light beam;
an optical part having an incident surface onto which the light beam is incident, and an exit surface from which the light beam applied through the incident surface is emitted, said optical part being formed so as to condense the light beam on the exit surface and having a numerical aperture not more than 0.75;
a storage medium holding mechanism for holding a storage medium, to which the light beam is applied, at a predetermined position; and
an optical part driving mechanism for driving said optical part in a state that the storage medium held by said storage medium holding mechanism and said exit surface are spaced from one another by a length not more than one-tenth of a wavelength of the light beam.

22. An optical memory apparatus according to claim 21, said optical part has a transmission unit permitting part of a predetermined optical intensity or more of the light beam emitted from the light emission unit to pass through said transmission unit.

23. An optical memory apparatus according to claim 22, wherein said transmission unit is made of a material in which part of an incident light energy is converted into a thermal energy, said material permitting an incident light to be transmitted at higher transmittance with higher temperature.

24. An optical memory apparatus according to claim 22, wherein said transmission unit is made of a saturable absorber having properties in which an absorbency index is lowered in accordance with an increment of an incident light intensity.

* * * * *